United States Patent [19]
Noda et al.

[11] 4,152,572
[45] May 1, 1979

[54] METHOD OF APPLYING ELECTRODES TO HIGH TEMPERATURE HEATING ELEMENTS FOR USE IN RESISTANCE FURNACES

[75] Inventors: Takaaki Noda, Nagoya, Japan; Anne M. Anthony, Orleans, France

[73] Assignee: Daido Steel Co., Ltd., Nagoya, Japan

[21] Appl. No.: 714,627

[22] Filed: Aug. 16, 1976

Related U.S. Application Data

[62] Division of Ser. No. 583,104, Jun. 2, 1975, abandoned.

[30] Foreign Application Priority Data

| | | | |
|---|---|---|---|
| Jun. 10, 1974 | [JP] | Japan | 49-65837 |
| Jun. 10, 1974 | [JP] | Japan | 49-65838 |
| Jul. 4, 1974 | [JP] | Japan | 49-76722 |
| Jul. 4, 1974 | [JP] | Japan | 49-76723 |

[51] Int. Cl.[2] .............. B23K 35/04
[52] U.S. Cl. .............. 219/118; 219/85 CM; 219/85 F; 29/621; 228/124
[58] Field of Search .............. 13/20, 25, 31; 29/621; 219/85 P, 85 CA, 85 CM, 85 F, 85 H, 85 M, 118; 228/206, 207, 122, 124

[56] References Cited

U.S. PATENT DOCUMENTS

| | | | |
|---|---|---|---|
| 2,418,460 | 4/1947 | Buehler | 228/122 X |
| 3,139,474 | 6/1964 | Weech | 13/31 |
| 3,284,879 | 11/1966 | Negre | 219/85 CM X |
| 3,449,545 | 6/1969 | Petitt | 219/118 X |
| 3,510,285 | 5/1970 | Murray et al. | 219/85 CM |
| 3,571,476 | 3/1971 | Anthony et al. | 13/20 |
| 3,602,979 | 9/1971 | Iácona | 228/122 |
| 3,666,913 | 5/1972 | Haefling et al. | 219/118 |

FOREIGN PATENT DOCUMENTS

| | | | |
|---|---|---|---|
| 260764 | 6/1912 | Fed. Rep. of Germany | 219/85 CM |

*Primary Examiner*—J. V. Truhe
*Assistant Examiner*—M. Paschall
*Attorney, Agent, or Firm*—Dennison, Dennison, Meserole & Pollack

[57] ABSTRACT

An electric resistance furnace adapted for operation at about 1,800° C. or higher temperatures even in an oxidizing or neutral atmosphere is disclosed. The furnace has a cylindrical heating chamber defined by a generally cylindrical heating element made of ceramic material, such as zirconium oxide and lanthanum chromide. The heating element has a wall thickness which is very small at its middle section and gradually increases toward each end. The middle section of the heating element defines the useful part of the heating chamber into which the heat generated by the heating element is effectively concentrated. An electrode comprising an annular foil of platinum is provided at each end of the heating element to pass electric current therethrough. A plurality of substantially equally spaced, longitudinally extending, parallel slots are present in the outer peripheral surface of each of the enlarged wall thickness portions of the heating element to provide allowance for thermal expansion of the heating element material. There is also disclosed a method of applying the electrodes to the heating element.

3 Claims, 9 Drawing Figures

METHOD OF APPLYING ELECTRODES TO HIGH TEMPERATURE HEATING ELEMENTS FOR USE IN RESISTANCE FURNACES

This is a division of application Ser. No. 583,104, filed June 2, 1975, now abandoned.

This invention relates to a high temperature electric resistance furnace and, more particularly, to a high temperature heating element for such a furnace.

Electric resistance furnaces are often used for producing mono-crystalline materials having high melting points and other special materials adapted for use at high temperatures, or studying the physical properties of various substances at high temperatures. In connection with these furnaces, it is known that heating elements made of ceramic material, such as zirconium oxide or zirconia ($ZrO_2$), thoirum oxide or thoria ($ThO_2$) and lanthanum chromide ($LaCrO_3$), can advantageously be used to raise the furnace temperature in an oxidizing or neutral atmosphere to a level in excess of about 1,800° C. which cannot be obtained economically under the same conditions if heating elements made of metals or silicon carbide are used. Zirconium oxide and thorium oxide show a very high resistance to electricity at a low temperature, though they become a good conductor at a temperature not lower than about 1,200° C. It is, therefore, usual practice to add calcium oxide (CaO), yttrium oxide ($Y_2O_3$) or the like to zirconium oxide or thorium oxide in order to improve the latter's electric conductivity even at a temperature lower than about 1,200° C. Such additives also act to improve the physical and mechanical properties of the heating elements made of zirconium oxide or thorium oxide. Lanthanum chloride is a good electric conductor even at an ambient temperature and may be used without requiring any such additives to make a heating element which can easily raise the furnace temperature to a level of about 1,800° C.

A plurality of rod-shaped heating elements made of such ceramic material as mentioned above are vertically supported in a furnace to form a circle in the center of which a charge is placed and heated when voltage is applied across the upper and lower ends of each heating element. As ceramic material, such as zirconium oxide, has a very low thermal conductivity, however, each heating element gains a considerably higher temperature on its inner side facing the charge than on its opposite or outer side, so that a great temperature difference develops between the inner and outer sides of the heating element during each cycle of furnace operation. Each heating element expands and contracts to a considerably greater extent on its inner side than on its outer side during each cycle of the furnace operation. The heating element thus tends to crack easily and becomes useless in a short time. Attempt has been made to solve this problem by enlarging the diameter of a heating element, but has been unsuccessful. The enlarged diameter simply widens the temperature difference between the inner and outer sides of the heating element, and does not contribute at all to preventing early cracking or breakage thereof. After all, it is imperative to minimize the diameter of a heating element in order to minimize the temperature difference between the inner and outer sides thereof. There are, however, certain limitations imposed by the mechanical strength required of such a heating element, and even if the diameter of a heating element is reduced to the minimum allowable to retain the necessary mechanical strength, there still exists between the inner and outer sides of the heating element a temperature difference which is often large enough to allow the heating element to crack and break in an unduly short time. The life of these rod-shaped heating elements is generally limited to about 100 to 200 hours, depending on the furnace temperature and operating conditions.

The prior art has also been unsatisfactory with respect to the means for connecting a heating element with a source of power supply. According to the conventional method, a hole is drilled in each end of a rod-shaped heating element, and one end of an electrical lead made of platinum is placed in the hole, and then, the hole is filled with an electrically conductive cement to secure the platinum lead to the heating element. This method, however, presents a serious problem which is due to the difference in the rate of thermal expansion and contraction between the heating element, the cement and the lead. Repeated expansion and contraction of the heating element from one cycle of furnace operation to another easily results in cracking around that portion of the heating element at which the electrical lead is connected thereto, so that the heating element tends to break in an unduly short time. It is a very troublesome job to detach the leads from a broken element in order to change it to a new one. This job causes a corresponding reduction in the operating efficiency of the furnace.

The heating chamber of the furnace is defined by a plurality of rod-shaped heating elements arranged in a circle. As the natural consequence, the temperature of the heating chamber is higher at points close to the heating elements than at other points far from them, with a resultant inability to obtain a uniform temperature distribution diametrically across the heating chamber. It is not possible to establish a desired temperature distribution along the length of the heating chamber, so that the furnace can only be operated with a low thermal efficiency.

It is an object of this invention to eliminate the foregoing drawbacks of the prior art and provide a high temperature electric resistance furnace equipped with a novel and improved high temperature heating element which defines a heating chamber capable of providing an excellent temperature distribution and thermal efficiency and has a very long life even in an oxidizing or neutral atmosphere to thereby permit a most efficient high temperature operation in the situation with which no furnaces of similar type known in the art have coped successfully.

This object may be attained, according to this invention, by providing a high temperature electric resistance furnace essentially comprising: a generally cylindrical high temperature heating element made of ceramic material and defining a cylindrical heating chamber therein, the heating element being vertically mounted radially inwardly of a cylindrical refractory wall coaxially with a vertically movable charge holder and having a constant inside diameter and an outside diameter varying along the length thereof in a generally concave pattern, the heating element having a substantially closed upper end and an open end defining a passageway for the charge holder into and out of the heating chamber upon vertical movement of the charge holder; and a pair of annular electrodes applied to the upper and lower ends, respectively, of the heating element; the heating element being so positioned as to locate the upper end of the charge holder in the mid-portion of the heating chamber when the charge holder stays in the upper extremity of the vertical movement thereof.

The high temperature heating element may be made of any appropriate ceramic material that is known per se, for example, zirconium oxide ($ZrO_2$) or thorium oxide ($ThO_2$) to which calcium oxide (CaO) or yttrium oxide ($Y_2O_3$) is added in order to improve the electric conductivity of zirconium oxide or thorium oxide at a lower temperature as well as their characteristics with respect to thermal expansion, or lanthanum chromide ($LaCrO_3$). According to a most important aspect of this invention, the heating element is shaped in the form of a special hollow cylinder having an outside diameter which is smallest in its middle section and gradually increases toward its opposite ends, while it has a constant inside diameter along the entire length thereof. With this unique shape, the heating element produces the largest quantity of heat in its middle section of minimum wall thickness which shows a larger resistance to electricity than any other portion of the element. The volume of heat generated by the heating element gradually decreases toward each end thereof with a gradual increase in wall thickness. It is, thus, easy to obtain a particularly high temperature in the mid-portion of the heating chamber in which the material to be heated is placed, relative to the remaining portions thereof. Moreover, the heating chamber is defined by the hollow interior of a single heating element. Accordingly, the furnace of this invention can be operated with an extremely high thermal efficiency as compared with any conventional furnace employing a plurality of rod-shaped heating elements arranged in a circle. It is also possible to develop a uniform temperature distribution transversely across the heating chamber because of its cylindrically enclosed construction. The temperature gradient obtainable along the length of the heating chamber may be varied in a variety of patterns by modifying the mode of variation in the outside diameter or wall thickness of the heating element. Therefore, the furnace of this invention may be effectively employed for a variety of local high temperature heating applications. The unique temperature gradient thus obtained can be effectively maintained, because the low thermal conductivity of the material of which the heating element is made prevents any undesirable transfer of an intense heat from the middle section to either end of the heating element.

Because of its cylindrical construction, the heating element according to this invention has a mechanical strength which is large enough to make it possible to reduce to a satisfactorily small value the wall thickness of its middle section in which the highest furnace temperature prevails. Accordingly, the temperature difference between the inner and outer sides of the middle section of the heating element can be reduced to a negligible level. It is, thus, possible to avoid the growth of an undesirable internal stress which would otherwise develop from the difference in the degree of thermal expansion between the inner and outer sides of the heating element. Those portions of the heating element which have an enlarged outside diameter are advantageously provided with a plurality of substantially equally spaced, longitudinally parallel slots in the outer peripheral surface thereof. These slots provide a sufficient allowance for thermal expansion of the material of the heating element to mitigate the growth of an internal stress therein to the extent that the element does not easily crack. Even if a crack develops in one location, the slots prevent any further growth of the crack extending to another portion around the heating element. Accordingly, the heating element according to this invention can be effectively placed in service for a period of time which is at least ten times as long as the life of any conventional rod-shaped element.

In case the heating element is made of a material, such as zirconium oxide and thorium oxide, which shows a very high resistance to electricity at a lower temperature, it is necessary in practice to preheat the heating element to a temperature of about 1,000° C. before the passage of electric current therethrough. With such material as zirconium oxide and thorium oxide, however, it is easy to obtain a maximum furnace temperature of about 2,000° C. or higher even in an oxidizing or neutral atmosphere once it is preheated to a level of about 1,000° C. at which the material becomes a good conductor of electricity. If the material of the heating element is lanthanum chromide, a maximum furnace temperature of about 1,800° C. can easily be obtained in an oxidizing or neutral atmosphere without requiring any preheating.

Each electrode is preferably formed by an annular foil of platinum which is substantially identical in shape to each end of the heating element. In case the heating element is made of zirconium oxide or thorium oxide, the electrodes are preferably applied to the heating element by coating each end of the heating element with a liquid in which platinum powder is mixed, applying an electrode under pressure onto each end of the element against a layer of platinum powder formed thereon and then supplying electric current to the electrodes. The current melts platinum powder and the molten platinum provides a mechanical joint between each electrode and the heating element which is highly conductive of electricity. Because of the excellent ductility of platinum, the electrodes closely follow the heating element in expansion and contraction during each cycle of furnace operation and do not cause any undue stress in the heating element, whereby a corresponding decrease in the possibility of the development of a crack in the element can be obtained to prolong the life of the element advantageously.

Alternatively, the electrodes may be applied to the heating element by spraying molten lanthanum chromide onto each end of the heating element to form a layer of lanthanum chromide thereon and bringing an electrode into contact with each end of the element. Molten lanthanum chromide can be effectively sprayed onto the ends of the heating element, because the element material, such as zirconium oxide, has a melting point as high as about 2,650° C., while the melting point of lanthanum chromide is 2,490° C. The layers of lanthanum chromide thus interposed between the electrodes and the heating element provide a highly electrically conductive joint therebetween. Lanthanum chromide has a coefficient of thermal expansion which is close to that of the element material, and therefore, closely follows the heating element in expansion and contraction during each cycle of furnace operation, so that the element does not easily crack, but can be effectively used for a long period of time. According to this alternative method, in which the electrodes merely contact the layers of lanthanum chromide, it is quite easy to change the heating element to a new one. It is sufficient to replace the old element with a new element after molten lanthanum chromide is sprayed onto each end of the new element. In order to apply electrodes to a heating element made of lanthanum chromide, it is enough to bring the electrodes into contact with the ends of the heating element, since lanthanum chromide is highly conductive of electricity even at an ambient temperature.

The invention will now be described in further detail with reference to the preferred embodiments thereof shown in the accompanying drawings, in which.

Figure 1:
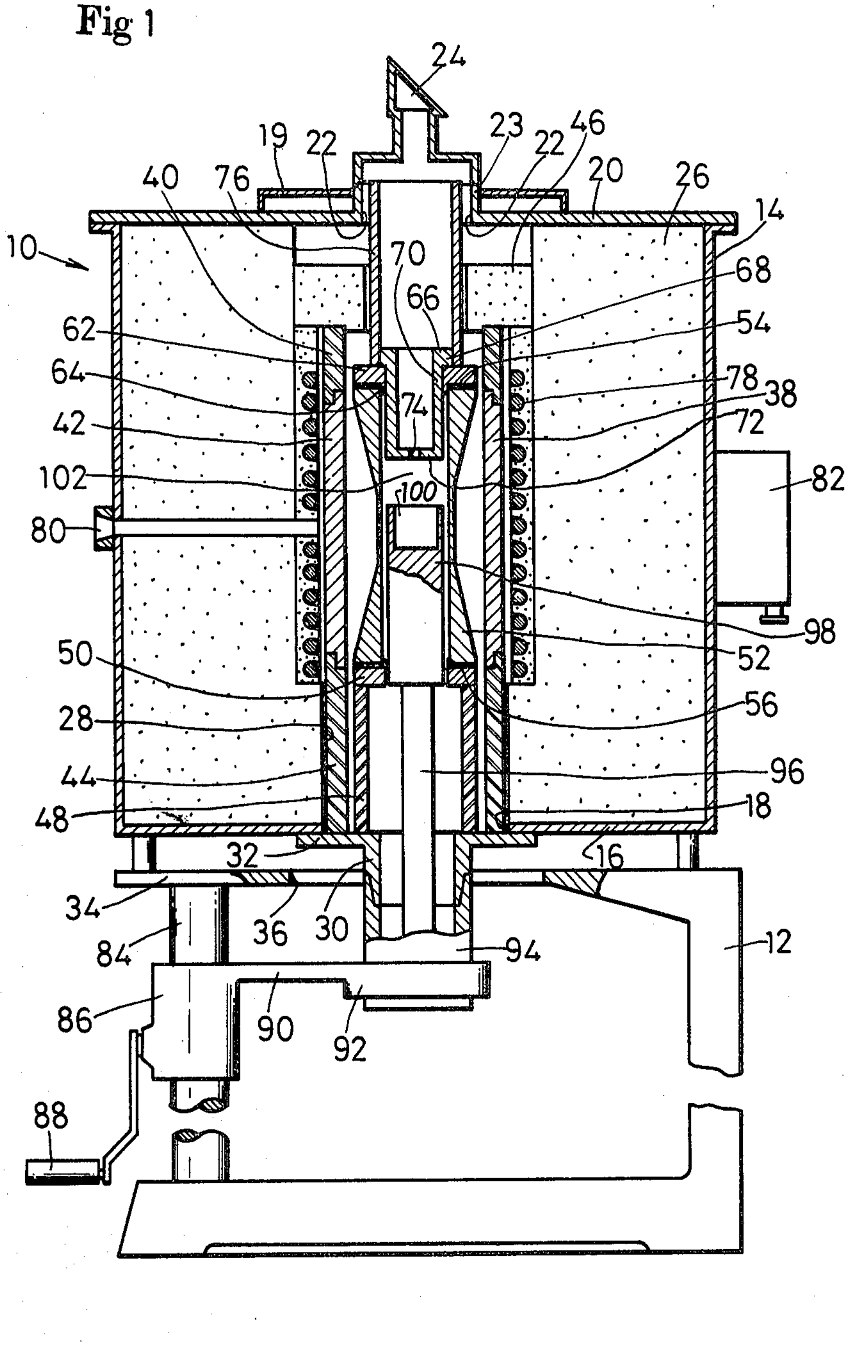
FIG. 1 is a partly omitted side elevational view in vertical section of a preferred embodiment of the furnace according to this invention.

Referring to FIG. 1 of the drawings, there is shown a high temperature electric resistance furnace 10 according to a preferred embodiment of this invention. The furnace 10 comprises a cylindrical shell 14 vertically mounted on a base support 12. The shell 14 includes a circular bottom plate 16 having a circular opening 18 in the center thereof. A circular cover plate 20 is removably secured by bolting or otherwise to the upper end of the shell 14 and is cooled by water at 19. The cover plate 20 is formed in the center thereof with a circular opening 22 which is concentric with the opening 18 of the bottom plate 16 and which defines an upwardly extending cylindrical projection 23. A sighting device 24 including a prismatic mirror is mountable to the cylindrical projection 23 as shown in FIG. 1 for the purpose of observing the interior of the furnace and determining the temperature thereof. The shell 14 is lined with a cylindrical layer 26 of thermal insulation, such as ceramic fiber, having an inside diameter which is substantially equal to the diameter of the opening 18 of the bottom plate 16 and defining an inside wall 28. A cylindrical supporting member 30 is removably attached to the bottom plate 16 and includes a radially outwardly extending annular flange 32. The flange 32 has an outer circumferential edge bolted or otherwise connected to the peripheral edge of the opening 18 of the bottom plate 16. The supporting member 30 has an axial bore which is coaxial with the inside wall 28. The base support 12 includes a top plate 34 having an opening 36 which is concentric with the flange 32 of the supporting member 30 and which has a diameter slightly larger than the outside diameter of the flange 32.

A cylindrical refractory wall 38 is vertically mounted on the flange 32 of the supporting member 30. The refractory wall 38 is coaxial with the inside wall 28 and has an outer peripheral surface slightly radially inwardly spaced from the inside wall 28. The lower end of the refractory wall 38 rests on the flange 32 and the upper end thereof is spaced below the cover plate 20. The refractory wall 38 comprises an upper portion 40, a lower portion 44 and a middle portion 42 interposed between the upper and lower portions 40 and 44. The middle portion 42 is formed with an annular shoulder at each end thereof. The shoulder formed on the upper end of the middle portion 42 is closely engaged with a complementary annular shoulder formed on the lower end of the upper portion 40 and the shoulder formed on the lower end of the middle portion 42 is closely engaged with a complementary annular shoulder formed on the upper end of the lower portion 44, so that the three portions of the refractory wall 38 are connected into a unitary structure. The middle portion 42 is substantially equally spaced from both the bottom plate 16 and the cover plate 20. The inside wall 28 includes an annular shoulder which is substantially flush with the upper end of the refractory wall 38. A horizontally disposed circular layer 46 of thermal insulation rests on the annular shoulder of the inside wall 28 and has an outer peripheral surface contacting the inside wall 28. The circular layer 46 of insulation contacts the upper end of the refractory wall 38 and is formed centrally therethrough with a circular hole which is coaxial with the opening 22 of the cover plate 20. The middle portion 42 of the refractory wall 38 is preferably made of a highly refractory material, such as zirconium oxide containing calcium oxide. The upper and lower portions 40 and 44 may be made of alumina as they are positioned for exposure to a considerably lower temperature than the middle portion 42.

A cylindrical member 48, which is made of alumina, is vertically supported in a position radially inwardly of the lower portion 44 of the refractory wall 38. The cylindrical member 48 is substantially equal in length to the lower portion 44 and has a lower end resting on the flange 32 of the supporting member 30. An annular supporting plate 50 rests on the upper end of the cylindrical member 48 coaxially with the refractory wall 38 and is made of "stabilized" zirconia or zirconium oxide containing calcium oxide or the like. A hollow, generally cylindrical high temperature heating element 52 is vertically supported on the supporting plate 50 coaxially with the refractory wall 38 and opens at both ends 58 and 60. A pair of annular electrodes 54 and 56 each made of a foil of platinum are applied to the upper and lower ends 58 and 60, respectively, of the heating element 52. One of the electrodes which is indicated at 56 is interposed between the supporting plate 50 and the lower end 60 of the heating element 52 and held in close contact with the latter. The heating element 52 is substantially equal in length to the middle portion 42 of the refractory wall 38 and is surrounded by the middle portion 42. The heating element 52 has a maximum outside diameter that is somewhat smaller than the inside diameter of the refractory wall 38. The heating element 52 and the electrodes 54 and 56, as well as the method of connecting both, will be described in further detail later on.

The other electrode 54 is held in close contact with the upper end 58 of the heating element 52 by an annular holding plate 62 which is made of "stabilized" zirconia. The holding plate 62 has an outside diameter which is substantially equal to the outside diameter of the upper end 58 of the heating element 52. The inside diameter of the holding plate 62 is slightly smaller than that of the heating element 52 and defines a small, coaxially extending cylindrical projection 64. The cylindrical projection 64 has an outside diameter which is equal to the inside diameter of the heating element 52, and is inserted into the upper end 58 through the electrode 54. The supporting plate 50 is shaped and sized similarly to the holding plate 62 and has a similar coaxially formed, short cylindrical projection extending into the lower end 60 of the heating element 52 through the electrode 56. This cylindrical projection facilitates properly centered positioning of the heating element 52 on the supporting plate 50. A cylindrical heat sealing cap 66 extends through the central hole of the holding plate 62 into the heating element 52. The cap 66 opens at its upper end which is formed with a radially outwardly extending flange 68. The lower surface of the flange 68 rests on the upper surface of the holding plate 62. The cap 66 comprises a vertically disposed cylindrical portion 70 extending through the cylindrical projection of the holding plate 62 into the heating element 52. The cylindrical portion 70 terminates in a lower end wall 72 having a central hole 74 which is coaxial with the opening 22 of the cover plate 20 and which is considerably smaller in diameter than the upper end opening of the cap 66. Thus, it will be noted that while the cap 66 substantially closes the upper end 58 of the heating element 52 to minimize the loss of heat therethrough, the hole 74 permits observation of the interior of the heating element 52 and measurement of the temperature prevailing therein. The flange 68 of the cap 66 has an outside diameter which is smaller than that of the holding plate 62. A vertically disposed, hollow cylinder 76 of alumina has a lower end resting on the holding plate 62 and encircling the flange 68 of the cap 66. The cylinder 76 extends upwardly through the central hole of the circular layer 46 of insulation and terminates in an open upper end which projects slightly above the upper end of the cylindrical projection 23 of the cover plate 20. The holding plate 62 is spaced below the circular layer 46 of insulation.

A metallic preheating element 78 is suitably supported on the inside wall 28 and surrounds the middle portion 42 of the refractory wall 38. The preheating element 78 is shaped in the form of a coil and may be made of any metal that is appropriate for the purpose. The preheating element 78 has an upper end located at a level slightly above the upper end 58 of the high temperature heating element 52 and its lower end is located slightly below the lower end 60 of the heating element 52. A sighting port or hole 80 is provided on one side of the shell 14 and horizontally extends through the cylindrical layer 26 of insulation. The sighting port 80 has an inner end opening toward the outside surface of the middle portion 42 of the refractory wall 38 in a position approximately halfway of the length of the middle portion 42. The sighting port 80 permits insertion of a device for detecting the preheating temperature, as well as observation of the refractory wall 38. Another sighting port or hole, not shown, is provided in a different location, for example, at right angles to the sighting port 80 for the preheating element 78 around the shell 14 and extends through the middle portion 42 of the refractory wall 38 to permit observation of the interior of the refractory wall 38 and determination of the high temperature prevailing therein. This latter port not shown preferably extends through the middle section of the high temperature heating element 52 to permit observation of the interior of the heating element 52 and determination of the temperature therein. The shell 14 also supports a terminal box 82 in which electrical devices are provided to supply electric current to the high temperature heating element 52 and the preheating element 78.

The base support 12 includes an upright guide post 84 on which a charging device 86 is vertically movably supported. The charging device 86 includes a handle 88 which cooperates with any known appropriate means not shown, for example, a rack system to move the charging device 86 vertically along the guide post 84. The charging device 86 also includes an arm 90 horizontally extending below the top plate 34 of the base support 12. The arm 90 terminates in a holding ring 92 which is coaxial with the inside wall 28 of the furnace. The holding ring 92 holds a vertically disposed cylindrical supporting member 94 which opens at its upper end, while its lower end is closed, and which is coaxial with the supporting member 30 attached to the shell 14 and equal to the cylindrical portion thereof both in inside and outside diameters. An upright supporting rod 96 made of alumina has a lower end secured to the supporting member 94 and is coaxial with the heating element 52. A generally solid, cylindrical charge holder 98 which is made of "stabilized" zirconia is vertically supported on the upper end of the supporting rod 96 coaxially therewith. The charge holder 98 has an upper end formed with a cavity 100 for holding the charge or material to be heated. The lower end of the stationary upper supporting member 30 and the upper end of the movable lower supporting member 94 are both beveled in a mutually complementary pattern, so that when the charging device 86 stays in the upper extremity of its vertical stroke, the upper and lower supporting members 30 and 94 are closely engaged with each other as illustrated in FIG. 1. The charge holder 98 has an outside diameter which is smaller than the inside diameter of the upper supporting member 30, so that when the charging device 86 is moved down and the lower supporting member 94 moves away from the upper supporting member 30, the charge holder 98 moves down through the upper supporting member 30 and is placed out of the shell 14. The outside diameter of the charge holder 98 is also slightly smaller than those of the supporting plate 50 and the heating element 52, so that when the charging device 86 is in the upper extremity of its vertical stroke, substantially the entire length of the charge holder 98 stays within the heating element 52, substantially occupying the lower half of the axial bore of the heating element 52 and the cavity 100 is positioned approximately halfway between the upper and lower ends 58 and 60 of the heating element 52, as shown in FIG. 1. The upper supporting member 30 is removably attached to the shell 14 by means of, for example, bolts connecting the flange 32 to the bottom plate 16. Accordingly, if the charging device 86 is lowered from its uppermost position shown in FIG. 1 after the flange 32 is disconnected from the bottom plate 16, the upper supporting member 30 moves down through the opening 36 of the top plate 34 of the base support 12, whereby the refractory wall 38 and the heating element 52 carried on the supporting member 30 can be easily placed out of the shell 14 for various purposes of inspection and maintenance, including replacement of the heating element 52 with a new one.

The axial bore of the high temperature heating element 52 defines a cylindrical effective heating chamber 102 with the cavity 100 of the charge holder 98 when the charge holder 98 is in its uppermost position. The clearance between the inner surface of the heating element 52 and the outer surface of the cylindrical portion 70 of the cap 66 is set at a minimum, so that the thermal efficiency of the effective heating chamber 102 can be maximized. Likewise, the clearance between the inner surface of the heating element 52 and the outer surface of the charge holder 98 staying within the heating element 52 is set at a minimum to minimize the loss of heat from the effective heating chamber 102.

The high temperature heating element 52 is preferably formed from "stabilized" zirconia ($ZrO_2+CaO$), which consists of zirconium oxide ($ZrO_2$) containing from 3 to 5% of calcium oxide (CaO) by weight. "Stabilized" zirconia is a material which only shows a practically satisfactory electric conductivity at an elevated temperature of about 1,000° C. The preheating element 78 is, thus, provided to preheat the high temperature heating element 52 to about 1,000° C.

A preferred form of the high temperature heating element 52 will now be described in detail with reference to FIG. 3. According to a general important feature of the structure shown in FIG. 3, the heating element 52, which has a constant inside diameter along the entire length thereof, has an outside diameter which generally gradually increases in an identical pattern toward the upper and lower ends 58 and 60, as is also clear from FIG. 1. The heating element 52 comprises a unitary structure formed by a middle section 104 having a constant wall thickness along its length, an upper section 106 generally gradually enlarged in outside diameter from the upper end of the middle section 104 toward the upper end 58 of the heating element 52 and a lower section 108 generally gradually enlarged in outside diameter from the lower end of the middle section 104 toward the lower end 60 of the heating element 52. The upper and lower sections 106 and 108 are mutually symmetrical with respect to the middle section 104. The upper and lower sections 106 and 108 discontinue their gradual increase in outside diameter in the proximity of the upper and lower ends 58 and 60, respectively, of the heating element 52 to define an upper end portion 110 and a lower end portion 112, respectively, which have a constant wall thickness. The upper and lower end portions 110 and 112 have an equal outside diameter which defines the maximum outside diameter of the heating element 52. The upper and lower end portions 110 and 112 of constant wall thickness provide a solution to an insufficient strength which the heating element 52 might suffer if the upper and lower ends 58 and 60 were formed with sharp edges. The upper section 106 is provided on its outer peripheral surface with a plurality of longitudinally extending slots 114 which are substantially equally spaced and parallel to one another. Each slot 114 extends through the upper end portion 110 along the axis thereof and has an upper end 116 opening at the upper end 58 of the heating element 52. Thus, the upper ends 116 of the slots 114 extend radially of the upper end 58 of the heating element 52. Each slot 114 has a lower end 118 located short of the upper end of the middle section 104. Each slot 114 increases its depth from its lower end 118 to upper end 116 in proportion to the gradual increase in outside diameter of the upper section 106, so that an elongate bottom surface 120 is defined which is parallel to the axis of the heating element 52. The lower section 108 of the heating element 52 is provided with a plurality of slots 122 in a pattern similar to the slots 114 in the upper section 106. No detailed description will be required in respect of the slots 122 in the lower section 108, except that needless to say, they are arranged upside down or symmetrically with the slots 114 in the upper section 106 relative to the middle section 104. It will be seen from FIG. 1 that the middle section 104 is so positioned as to surround the cavity 100 of the charge holder 98 in which the material to be heated is placed, when the charge holder 98 is raised to its uppermost position.

Figure 4:
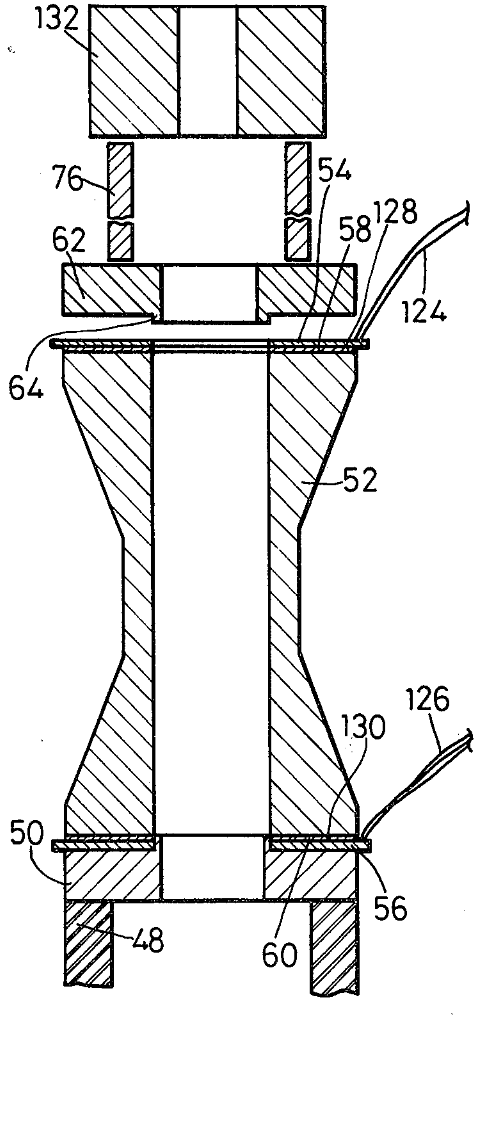
FIG. 4 is a fragmentary longitudinal sectional view illustrating an example of the method of connecting an electrode to each end of the heating element shown in FIG. 3.

The electrodes 54 and 56 are each formed by an annular foil of platinum having a thickness of, say, 0.1 mm. Although not specifically shown in the drawings, each electrode is provided around its inner circumference with a plurality of (for instance, three) radially extending slits which are equally spaced from one another to provide allowance for thermal expansion. The two electrodes 54 and 56 are slightly larger in outside diameter than the upper and lower ends 58 and 60, respectively, of the heating element 52 and at least one electrical lead 124 or 126 is connected to the outer circumferential edge of each electrode, as shown in FIG. 4. More than one electrical lead is often advantageously provided for each electrode, depending on the electrical capacity of the heating element 52, which is determined by its cross-sectional area. For example, each electrode is preferably provided with three electrical leads each between one pair of slits.

Referring now to FIG. 4, description will be made of an example of the method of connecting the electrodes 54 and 56 to the upper and lower ends 58 and 60, respectively, of the heating element 52. Each of the upper and lower ends 58 and 60 of the heating element 52 is worked by machining or otherwise to have the smoothest possible surface finish thereon. The ends 58 and 60 of the heating element 52 are wiped with a cloth soaked in an alcoholic solvent, such as acetone, so that any oily or other foreign material is removed therefrom. A paste of platinum powder is prepared by mixing and stirring platinum powder in an alcoholic or volatile solvent, such as benzol and acetone, and coated by a brush onto each end 58 or 60 of the heating element 52 in order to form a film of platinum powder 128 or 130 having a generally uniform thickness thereon. The electrodes 54 and 56 are applied onto the films 128 and 130 of platinum powder, respectively, in such a manner that the central holes of the electrodes 54 and 56 are aligned with the axial bore of the heating element 52. The heating element 52 is then placed on the supporting plate 50 in axial alignment therewith. The upwardly extending cylindrical projection of the supporting plate 50 facilitates centering of the heating element 52 properly with respect to the supporting plate 50. The downwardly extending cylindrical projection 64 of the holding plate 62 is inserted into the upper end 58 of the heating element 52 and the holding plate 62 is placed on the electrode 54. After the alumina cylinder 76 is vertically positioned on the holding plate 62 in axial alignment therewith, the charging device 86 is raised to its uppermost position to bring the heating element 52 into its predetermined position within the furnace 10 as shown in FIG. 1. The sighting device 24 is detached from the cylindrical projection 23 of the cover plate 20. An appropriate weight 132 is placed on the upper end of the alumina cylinder 76 to urge the electrodes 54 and 56 into close contact with the upper and lower ends 58 and 60, respectively, of the heating element 52 with the films 128 and 130 of platinum powder therebetween. Then, electric current is supplied to the preheating element 78 to preheat the high temperature heating element 52. After the heating element 52 is preheated to a temperature of about 1,000° C. at which the heating element 52 is a good conductor of electricity, voltage is applied across the electrodes 54 and 56 through the leads 124 and 126 to pass electric current through the heating element 52.

Because of the nature of the material of which the heating element 52 is made, neither of the upper and lower ends 58 and 60 thereof is not provided with a 'smooth' surface finish in the true sense of the word, but numerous fine concavities exist on the upper and lower ends 58 and 60 of the heating element 52 even after they are worked by machining or otherwise. Accordingly, neither of the films 128 and 130 of platinum powder can be formed with a really uniform thickness, but each of such films 128 and 130 has numerous discontinuous points over the whole area thereof. Thus, there exist a lot of spots all over each of the films 128 and 130 which fail to show a good electrical conductivity. Upon application of voltage across the electrodes 54 and 56, therefore, sparks issue at those spots and melt the platinum powder in the vicinity thereof. Molten platinum fills the fine concavities of the upper and lower ends 58 and 60 of the heating element 52, while becoming fused with the electrodes 54 and 56 which are made of platinum. Although the connection thus formed between the heating element and each electrode is not the consequence of any chemical reaction between the materials of which they are made, but is merely a mechanical joint, the molten platinum filling the fine concavities of the upper and lower ends 58 and 60 of the heating element 52 very satisfactorily serve to connect the electrodes 54 and 56 to the upper and lower ends 58 and 60, respectively, of the heating element 52 securely in close contact therewith.

Figure 5:
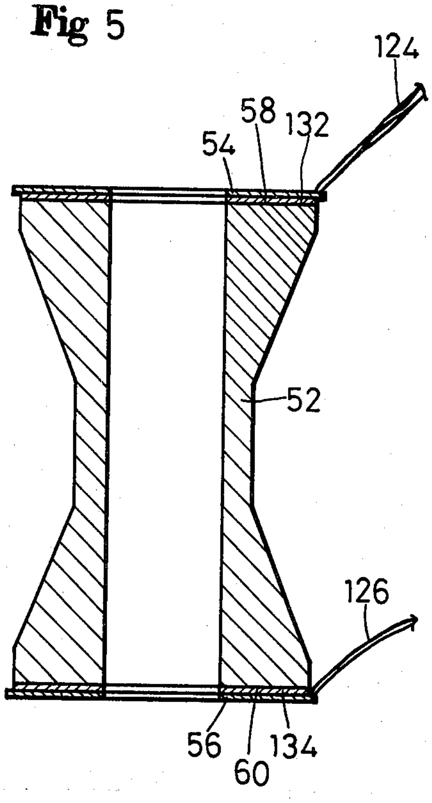
FIG. 5 is a view similar to FIG. 4 and illustrating another example of the method of connecting an electrode to each end of the heating element shown in FIG. 3.
Figure 6:
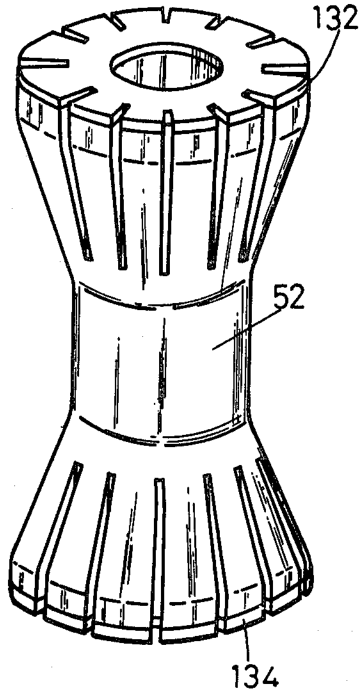
FIG. 6 is a perspective view of the heating element which is ready for electrode connection by the method illustrated in FIG. 5.

Attention is now directed to FIG. 5 illustrating another example of the method of connecting the electrodes 54 and 56 to the heating elements 52. The upper and lower ends 58 and 60 of the heating element 52 are wiped with a cloth soaked in an alcoholic or volatile solvent, such as acetone, whereby any oily or other foreign material is removed therefrom. Molten lanthanum chromide is sprayed onto each of the upper and lower ends 58 and 60 of the heating element 52 to form a generally flat layer 132 and 134 of lanthanum chromide thereon. Molten lanthanum chromide is sprayed after the central opening and outer peripheral slots of the heating element 52 are closed by plugs of any appropriate material which project from each end of the heating element 52 along the axis thereof, so that the layers 132 and 134 of lanthanum chromide are advantageously formed in the shape which is substantially identical in transverse section to the upper and lower ends 58 and 60, respectively, of the heating element 52 as shown in FIG. 6. After lanthanum chromide solidifies, a smooth surface finish is given to the exposed surface of each of the layers 132 and 134 by machining or otherwise. The electrodes 54 and 56 are placed in contact with the respective layers 132 and 134 of lanthanum chromide and the heating element 52 is positioned in the furnace 10 in the same manner as hereinbefore described with reference to the method of FIG. 4. No further steps, such as those described with reference to FIG. 4, are required to connect the electrodes 54 and 56 to the heating element 52 with the lanthanum chromide layers 132 and 134 therebetween. It is sufficient that the lanthanum chromide layers 132 and 134 are merely interposed between the electrodes 54 and 56 and the heating element 52 in close contact therewith. Lanthanum chromide is a good electrical conductor even at an ambient temperature and the mere interposition of its layers 132 and 134 between the electrodes and the heating provides a satisfactory conductive joint therebetween, particularly in view of the fact that the heating element 52 is preheated to an elevated temperature prior to operation.

Figure 7:
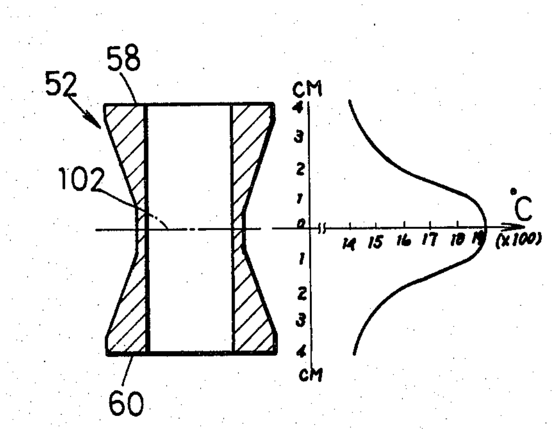
FIG. 7 is a graph showing an example of the temperature gradient which may be obtained along the length of the heating chamber by the heating element employed in the furnace of FIG. 1.

In the operation of the furnace 10 shown in FIG. 1, electric current is first supplied to the preheating element 78 to preheat the high temperature heating element 52 to a temperature of about 1,000° C., and the charging device 86 is raised to charge the heating chamber 102 with the material to be heated. Then, electric current is supplied through the heating element 52 via the leads 124 and 126 to heat the charge to a desired temperature for a predetermined length of time. As hereinbefore described, the volume of the heat which is generated by the heating element 52 is maximum at its middle section 104 and decreases as its wall thickness increases toward the upper and lower ends 58 and 60. As also described before, "stabilized" zirconia has such a low thermal conductivity that the intense heat produced at the middle section 104 is not easily transferred in either direction therefrom. It is, therefore, quite easy to establish a unique temperature gradient, as shown by way of example in FIG. 7, along the axis of the heating element 52. According to this temperature gradient, the peak temperature prevails in the effective heating chamber 102 surrounded by the middle section 104 of the heating element 52 and is considerably higher therein than in any other location along the heating element 52.

Figure 2:
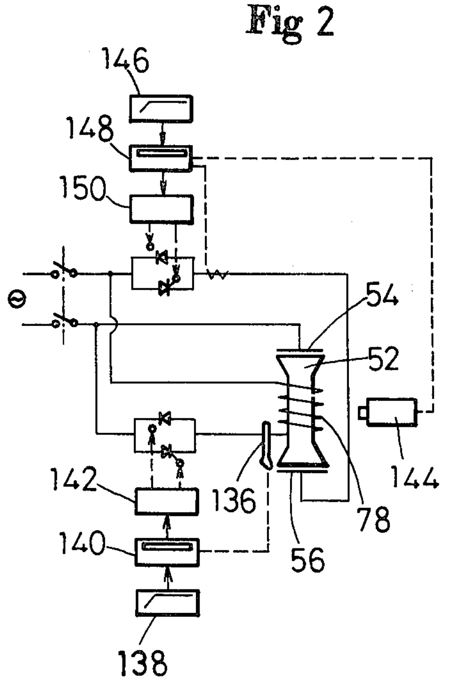
FIG. 2 is a schematic diagram showing an example of the means for supplying electric current to the various parts of the furnace shown in FIG. 1 and controlling the temperatures thereof.

The control of power supply to the preheating element 78 and the high temperature heating element 52 is both effected automatically in accordance with a predetermined temperature control program. A typical arrangement which may be advantageously employed for such program control is shown in FIG. 2. In order to control the power supply to the preheating element 78, the temperature of the refractory wall 38 is detected through the sighting port 80 by a temperature measuring device 136 and is compared at a temperature controller 140 with the value set in a temperature setter 138. In accordance with the temperature difference ascertained by such comparison, the temperature controller 140 transmits a signal to a power supply controller 142 and the power supply controller 142 turns on and off the power supply to the preheating element 78 as required in response to the signal received from the temperature controller 140. The power supply to the high temperature heating element 52 is effected in a similar fashion, except that it is continuous instead of being subjected to ON-OFF control. The temperature prevailing in the heating chamber 102 is detected through the opening 22 of the cover plate 20 by a temperature measuring device 144 and is compared at a temperature controller 148 with the value set in a temperature setter 146. In accordance with the temperature difference ascertained by such comparison, the temperature controller 148 transmits a signal to a power supply controller 150 and the power supply controller 150 continuously controls the amount of electric current flowing through the heating element 52. The temperature measuring devices 136 and 144 may both comprise any appropriate means known in the art, including a platinum-rhodium or other thermocouple, or optical devices such as a radiation pyrometer and a two-color pyrometer. Likewise, any other devices or means described with reference to FIG. 2 may be selected from those known in the art. Accordingly, no further description of any of the devices shown in FIG. 2 will be required. It is needless to say that the sighting device 24 must be detached from the cover plate 20 in order to insert a thermocouple to detect the temperature of the heating chamber 102 through the top of the furnace 10 without relying upon any optical pyrometer. Alternatively, the temperature of the heating chamber 102 can be determined, whether by means of a thermocouple or an optical pyrometer, through another sighting port, not shown, extending transversely of the furnace as hereinbefore described.

The preheating element 78 remains in operation under ON-OFF control throughout the duration of furnace operation to maintain the temperature prevailing around the refractory wall 38 at about 1,200° C. In addition to its function of preventing heat loss from the high temperature heating element 52, the refractory wall 38 serves to prevent any undue thermal impact from being imparted to the high temperature heating element 52 by the preheating element 78 during the preheating stage of the furnace operation. The refractory wall 38 protects the preheating element 78 against exposure to the intense heat generated by the heating element 52 during the high temperature heating operation.

Figure 8:
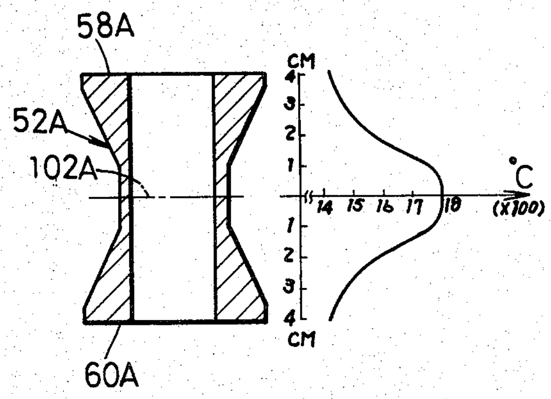
FIG. 8 is a view similar to FIG. 7, showing an example of the temperature gradient which may be obtained by the heating element made of a different material.

The furnace of this invention may also comprise a high temperature heating element 52A which is made of any other ceramic material, for instance, lanthanum chromide. Lanthanum chromide is a good conductor of electricity even at an ambient temperature and the furnace, therefore, does not require any preheating element any longer. In any other respect, the furnace may be constructed as hereinbefore described with reference to FIG. 1, and the heating element 52A may be shaped as already described with reference to FIG. 3. The heating element 52A defines therein a cylindrical heating chamber 102A along which a unique temperature gradient may be established as typically shown in FIG. 8.

Figure 3:
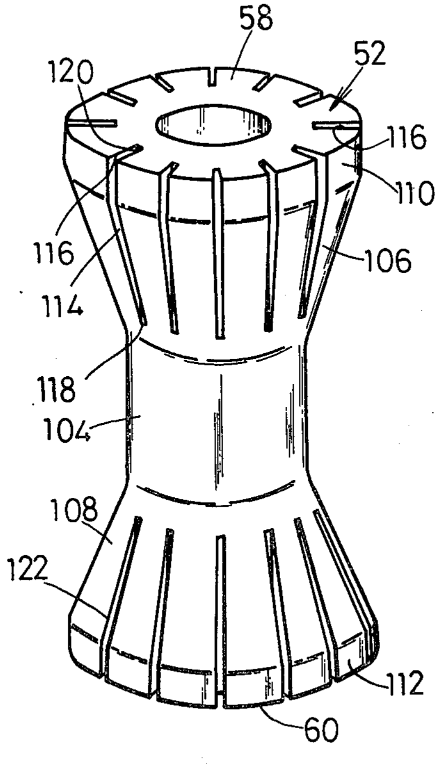
FIG. 3 is a perspective view of the high temperature heating element employed in the furnace of FIG. 1.
Figure 9:
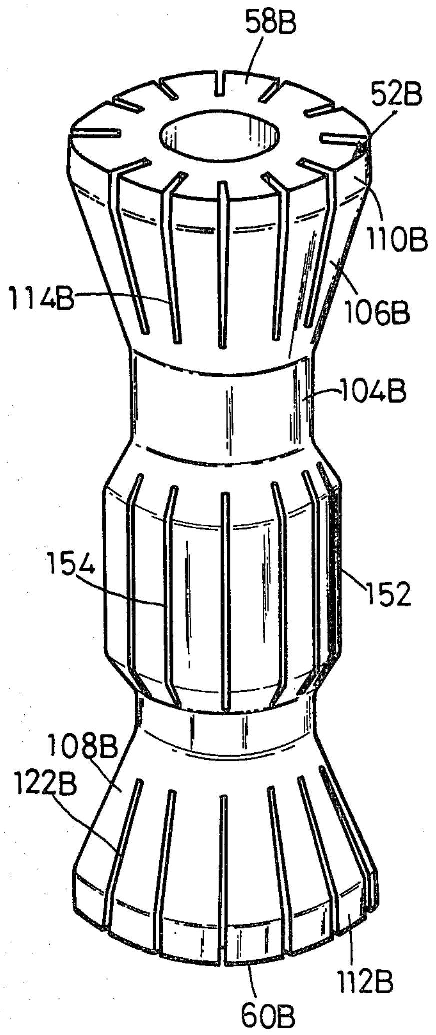
FIG. 9 is a perspective view showing a modified form of the heating element which may be employed in the furnace of FIG. 1.

The shape of the high temperature heating element for the furnace of this invention is not limited to that shown in FIG. 3, whether it is made of zirconia or lanthanum chromide, but may advantageously be modified in a variety of ways according to the temperature gradient desired in the heating chamber. One modified form of the heating element is shown in FIG. 9 and is generally indicated by the numeral 52B. The heating element 52B is generally cylindrical in construction and the opposite end portions thereof are similar to those of the structure shown in FIG. 3. No description is made herein of any such similar portions, each of which is indicated in FIG. 9 by suffixing the letter "B" to the reference numeral used in FIG. 3 to denote the corresponding portion of the heating element 52. According to a distinctive feature of the structure shown in FIG. 9, the heating element 52B has an elongate middle section 104B as compared with the structure shown in FIG. 3 and the middle section 104B includes a cylindrical portion 152 of enlarged outside diameter which is substantially equally spaced from the upper and lower sections 106B and 108B. The enlarged portion 152 divides the middle section 104B into a pair of portions each defining the minimum wall thickness of the heating element 52B. The enlarged portion 152 has a generally constant wall thickness which is considerably smaller than that of the upper and lower end portions 110B and 112B. Each end of the enlarged portion 152 is gradually reduced in outside diameter to converge to one of the minimum wall thickness portions. The enlarged portion 152 is provided with a plurality of substantially equally spaced, longitudinally extending parallel slots 154 in a fashion similar to the upper and lower sections 106B and 108B. Each slot 154 has a constant depth substantially along its length, but its depth gradually decreases at each end of the enlarged portion 152 in correspondence with the gradual reduction in outside diameter. It will be easily understood that the heating element 52B shown in FIG. 9 provide a unique temperature gradient having a couple of peak points each adjacent to one end of the enlarged portion 152 of the middle section 104B. The heating element 52B is, thus, particularly suitable for such applications as local heating of an elongate material at both ends thereof.

Although the invention has been described with reference to a few preferred embodiments thereof, it is to be understood that further modifications or variations may be easily made by those skilled in the art without departing from the scope of the invention which is defined by the appended claims.

What we claim is:

1. A method of connecting electrodes to a high temperature heating element comprising the steps of:
 - providing a smooth surface finish with multiple fine concavities on the upper and lower ends of said high temperature heating element;
 - removing oily and other foreign material from said upper and lower ends;
 - applying a layer of platinum paste incorporating platinum powder on said smooth surface of each of said upper and lower ends;
 - applying said electrodes under pressure onto the outer surfaces of said layers of platinum paste on said upper and lower ends, respectively;
 - preheating said high temperature heating element, without passage of an electric current therethrough, to a temperature which is high enough to make said heating element a good conductor of electricity; and
 - applying sufficient voltage across said electrodes, subsequent to a preheating of the high temperature heating element, to effect arcing and a melting of the platinum powder at said concavities and an attendant filling of the concavities with the molten platinum and a fusion of the molten platinum with said electrodes to mechanically connect said electrodes with said upper and lower ends, respectively, of said heating element.

2. The invention as defined in claim 1 wherein said layers of platinum paste are formed by coating said upper and lower ends, respectively, of said heating element with a mixture of platinum powder in a solvent selected from the group of alcoholic solvents including benzol and acetone.

3. The invention as defined in claim 2 wherein said oily and other foreign material is removed by wiping said upper and lower ends of said heating element with a cloth soaked in an alcoholic solvent.

* * * * *

UNITED STATES PATENT AND TRADEMARK OFFICE
CERTIFICATE OF CORRECTION

PATENT NO. : 4,152,572

DATED : May 1, 1979

INVENTOR(S) : Takaaki Noda and Anne M. Anthony

It is certified that error appears in the above-identified patent and that said Letters Patent are hereby corrected as shown below:

Column 1, line 18, "thoirum" should be -- thorium --

Column 1, line 35, "chloride" should be -- chromide --

Column 12, after the word "heating" which bridges lines 13 and 14, insert -- element --.

As assignee, in addition to Daido Steel Co., Ltd. of Nagoya, Japan, Agence Nationale de Valorisation de la Recherche of Neuilly-sur-Seine, France should also be included.

Signed and Sealed this

***Fourth* Day of *September 1979***

[SEAL]

*Attest:*

LUTRELLE F. PARKER

*Attesting Officer* *Acting Commissioner of Patents and Trademarks*